United States Patent [19]

Luick et al.

[11] Patent Number: 5,890,009
[45] Date of Patent: *Mar. 30, 1999

[54] VLIW ARCHITECTURE AND METHOD FOR EXPANDING A PARCEL

[75] Inventors: David A. Luick; Philip B. Winterfield, both of Rochester, Minn.

[73] Assignee: International Business Machines Corporation, Armonk, N.Y.

[21] Appl. No.: 764,004

[22] Filed: Dec. 12, 1996

[ * ] Notice: This patent issued on a continued prosecution application filed under 37 CFR 1.53(d), and is subject to the twenty year patent term provisions of 35 U.S.C. 154(a)(2).

[51] Int. Cl.[6] .................................. G06F 9/38; G06F 9/30
[52] U.S. Cl. ...................... 395/800.24; 395/391; 395/384
[58] Field of Search .............................. 395/800.24, 391, 395/376, 379, 384

[56] References Cited

U.S. PATENT DOCUMENTS

| | | | |
|---|---|---|---|
| 4,766,566 | 8/1988 | Chuang | 395/800.23 |
| 5,057,837 | 10/1991 | Colwell et al. | 341/55 |
| 5,179,680 | 1/1993 | Colwell et al. | 711/125 |
| 5,193,158 | 3/1993 | Kinney et al. | 395/591 |
| 5,197,135 | 3/1993 | Eickemeyer et al. | 395/393 |
| 5,307,506 | 4/1994 | Colwell et al. | 395/307 |
| 5,333,280 | 7/1994 | Ishikawa et al. | 395/588 |
| 5,371,864 | 12/1994 | Chuang | 395/382 |
| 5,404,469 | 4/1995 | Chung et al. | 395/391 |
| 5,408,658 | 4/1995 | Rechtschaffen et al. | 395/392 |
| 5,412,784 | 5/1995 | Rechtschaffen et al. | 395/595 |
| 5,438,668 | 8/1995 | Coon et al. | 395/380 |
| 5,442,760 | 8/1995 | Rustal et al. | 395/800.24 |
| 5,442,762 | 8/1995 | Kato et al. | 395/800.24 |
| 5,625,835 | 4/1997 | Eibcioglu et al. | 395/800.24 |

OTHER PUBLICATIONS

IBM Technical Disclosure Bulletin, vol. 23, No. 10, Mar. 1991, pp. 4700–4701, entitled "Dynamic Microinstruction Word Width Expansion" by D M Jones.

K. Ebcioglu, "Some Design Ideas for a VLIW Architecture for Sequential Natured Software, " In Parallel Processing (Proceedings of IFIP WG 10.3 Working Conference on Parallel Processing). M. Cosnard et al (eds.). pp. 1–21, North Holland, 1988.

Abnous et al. "Special Features of a VLIW Architecture" IEEE 1991.

"Harp: A VLIW RISC Processor"; Findlay et al. IEEE 1991.

DeGlosia et al. "A Programmable Instr. Format Extension to VLIW Architecture " IEEE, 1992.

Labrousse et al. "Create—Life: A Module Design Approach for high Performous ASIC's" 1990.

Primary Examiner—Larry D. Donaghue
Attorney, Agent, or Firm—Gary Yacura; Karuna Ojanen; Birch, Stewart, Kolasch, & Birch

[57] ABSTRACT

A very long instruction word (VLIW) architecture and method provide for functionally expanding a parcel. The instruction register of the VLIW architecture is divided into a plurality of parcels, each of which has corresponding processing logic. The processing logic performs various functions based on the data within the corresponding parcel. A single parcel, however, can only specify a limited number of functions or include a limited amount of data for processing such that the level of optimization for a given VLIW may be impeded. The selector logic and processing logic, however, allow for data from a non-corresponding parcel to be selected and processed. In this manner, the functions and/or amount of data for processing in a single parcel can be expanded by using data from a non-corresponding parcel.

31 Claims, 4 Drawing Sheets

VLIW ARCHITECTURE AND METHOD FOR EXPANDING A PARCEL

FIELD OF THE INVENTION

The present invention relates to a very long instruction word (VLIW) architecture for a digital computer system, and in particular to a VLIW architecture and method for functionally expanding an instruction parcel.

BACKGROUND OF THE INVENTION

A modern computer system typically comprises a central processing unit (CPU), and other supporting hardware such as system memory, communications busses, input/output controllers, storage devices, etc. The CPU is the heart of the system. It executes the instructions which comprise a computer program and directs the operation of the other system components.

From the standpoint of the computer's hardware, all systems, from the earliest to the most modern, operate in fundamentally the same manner. Processors are capable of performing a limited set of very simple operations, such as arithmetic, logical comparisons, and movement of data from one location to another. But each operation is performed very quickly. The programs which direct the machine to perform massive numbers of these very simple operations give the illusion that the machine is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase the clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of the circuits, and by various other techniques. However, designers can see that physical size reductions can not continue indefinitely, and there are limits to their ability to continue to increase clock speeds of processors. Attention has therefore been directed to other approaches for further improvements in overall speed of the computer system.

Without changing the clock speed, it is still possible to improve system speed by using multiple processors. The modest cost of individual processors packaged on integrated circuit chips has made this practical. It is now nearly universal, for example, to use slave processors to perform various tasks within a computer system, such as input/output device communications and control. Typically, such slave processors execute a single special-purpose program repeatedly. The use of such slave processors considerably improves system speed, by off-loading work from the CPU to the slave. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously.

It is much more difficult, however, to improve the speed at which a single task, such as an application program, executes. The problem with multiple CPUs is the coordination of function. For slave I/O processors this is not so difficult because function is pre-defined and limited. It is much more difficult to coordinate function among multiple CPUs executing general purpose application programs, the details of which the system designers don't know in advance. Most application programs follow a single path or flow of steps performed by the processor. While it is sometimes possible to break up this single path into multiple parallel paths, there is no known algorithmic approach for doing so. Generally, this must be done on a case-by-case basis, and in a non-automated manner. Such a time-consuming approach to programming is not justified for a vast array of application programs.

Thus, while multiple processors improve overall system performance, there are still many reasons to improve the speed of the individual CPU. If the CPU clock speed is given, it is possible to further increase the speed of the CPU (i.e., the number of operations executed per second) by increasing the average number of operations executed per clock cycle.

Various processor hardware design techniques have been used to increase the average number of operations executed per clock cycle. These have involved, for example, the use of pipelines, multiple execution units with look ahead hardware for finding instructions to execute in parallel, etc. Limited improvement is possible using these techniques, but the hardware support required is often massive.

Another approach is a hybrid in which a single CPU has characteristics of both a uniprocessor and a parallel machine. In this approach, a single instruction register and instruction sequence unit execute programs under a single flow of control, but multiple arithmetic/logic units (ALUs) within the CPU can perform multiple primitive operations (i.e., simple arithmetic, logic, or data transfer operations) simultaneously. Rather than hardware determining all the simultaneous operations to be performed at execution time, a compiler determines this before execution and formats the instructions in such a way to specify the parallel operations. Because the instruction word held in the instruction register must specify multiple independent operations to be performed by the different ALUs, this approach will typically employ a very long instruction word (VLIW) to perform such multiple independent operations, and it is commonly known as a VLIW architecture.

Several academic papers have suggested that a VLIW architecture can in many applications achieve greater parallelism and greater speed than multiple independent processors operating in parallel. The theory underlying VLIW is that the typical application program has a single flow of control, but many of the primitive operations within that flow can be performed in parallel. Therefore an automated compiler for a VLIW machine does not have to alter program flow (something which has been almost impossible to automate in parallel processor machines). It only has to determine which primitive operations can be performed in parallel. While even this is a difficult task in practice, it should lend itself to automation much more readily than the altering of program flow.

Although there has been some research and experimentation concerning VLIW architectures, such machines have yet to gain widespread commercial acceptance. The VLIW architectural concept is still in its early stages of evolution. A number of problems must be overcome before such machines can effectively compete commercially with more evolved older designs.

One such problem is the size and format of the instruction word. The expected size of the instruction word imposes significant burdens on the supporting hardware, such as memory, instruction cache, buses, etc. VLIW designs anticipate a large instruction word for several reasons. First, each of the ALUs requires its own command, which can include an operation code, source and destination designations, etc. Second, there must be a conditional branching mechanism appropriate to the VLIW architecture. Because many simple operations are being performed with each instruction, the effectiveness of a VLIW machine would be limited if only one conditional branch were allowed in a given instruction, as is usually the case in a conventional machine. Therefore it is desirable to permit conditional branching to multiple destinations from a single VLIW instruction, a characteristic referred to as N-way branching. Of course, all of the branch conditions and destinations must in some way be specified in the instruction. Third, because a theoretically pure VLIW design employs a large pool of data registers, and other special registers, any of which can be assigned arbitrarily as source or destination for the various operations, the number of bits in the instruction required for identifying each source and destination register is greater than for a conventional design employing a smaller number of registers.

A research report entitled "Some Design Ideas for a VLIW Architecture for Sequential-Natured Software," by Kemal Ebcioglu and published in *Proceedings of IFIP WG 10.3 Working Conference on Parallel Processing*, (M. Cosuard et al., ed.) North Hellard 1988, discusses known techniques for compiling code into VLIWs and known VLIW architectures. Mr. Ebcioglu also suggests additional VLIW compilation techniques and VLIW architecture.

The major hardware components of a computer system 100 for utilizing a VLIW processor architecture are shown in FIG. 1. A CPU 101 for processing instructions is coupled to separate caches 103 and 104. Instruction cache (I-cache) 103 stores instructions for execution by CPU 101. Although illustrated as separate elements, the I-cache 103 and the data cache (D-cache) 104 can be disposed on the same chip as the CPU 101 and are often considered as forming a part of the CPU 101. D-cache 104 stores data to be used by CPU 101. Both caches communicate with random access, "main storage," memory 102. The CPU 101 and the main storage 102 also communicate via a bus interface 105 and system bus 110. Various I/O processing units (IOPs) 111–115 attach to the system bus 110 and support communication with a variety of storage and I/O devices, such as direct access storage devices (DASD), tape drives, workstations, printers, and remote communication lines.

FIG. 2 is a high level diagram of the major components of CPU 101 (except for main storage 102). It should be understood, however, that in FIG. 2 the various data paths within CPU 101 have been represented in greatly simplified form for clarity. In reality, many separate data paths into and out of the various components are required to support simultaneous data flow to and from multiple ALUs, registers, cache locations, etc. Additionally, many data and control lines have been omitted entirely from FIG. 2 for clarity.

An instruction register 200 stores the current instruction being executed by the CPU 101. The very long instruction word for which this approach is named becomes an integral part of the hardware when it is loaded into the instruction register 200. This single register must be large enough to store a full VLIW instruction because the entire instruction is needed to control the hardware for one cycle. The instruction contains "parcels" or "slots," each of which is equivalent to one elementary or primitive operation (such as ADD, COMPARE, or LOAD). When loaded into the instruction register 200, each parcel occupies a specific set of bit positions, and will control those hardware resources hard-wired to those positions. If an instruction does not contain the maximum number of parcels, (due to the compiler's inability to find sufficient parallelism for that point in the program) then the unused bit portions must be reset appropriately. The instruction also includes "mask" fields, which are the values against which conditional code settings are compared. The instruction further includes "next" fields which contain the address of the VLIW instruction to be loaded next if the condition codes match the corresponding mask.

Connected to the instruction register 200 is the I-cache 103 which stores the next instructions to be executed. As is well known, this I-cache 103 can include a series or levels of cache. Typically the levels of I-cache range from L0 cache to L1 cache on chip and L2 cache and L3 cache off chip. Preferably, the next instruction should be found in the L0 cache which is located closest to the instruction register 200; thus, reducing the amount of time needed to load the next instruction into the instruction register 200. Each successive level of cache is located further from the instruction register 200; and consequently, requires a longer period of time to load an instruction into the instruction register 200. Instructions not stored in the I-cache 103 are stored in main storage 102 connected to the I-cache 103. Besides storing instructions, main storage 102 may also store data.

Instruction decode and sequencer logic 202 is connected to the instruction register 200 and the I-cache 103. The instruction decode and sequencer logic 202 decodes the instruction in instruction register 200 to determine the operations to be performed, and determines the address of the next instruction to execute. Determining the next instruction to execute is performed in part based on the condition code values stored in condition registers 208. These condition code values are discussed in greater detail below.

Connected to the instruction register 200 are a plurality of arithmetic/logic units ALU0–ALU(N+M) where N+M can be any desired number but is typically 16 or less. Likewise, the number of parcels N+M can be any desired number. Each parcel provides an instruction to a corresponding one of ALU0–ALU(N+M) via the instruction decode and sequencer logic 202 (the connections between instruction decode and sequencer logic 202 and the ALU0–ALU(N+M) have been omitted for clarity). This same parcel will tell the ALU where to find the data upon which to operate, such as in the parcel itself or in one of a plurality of general purpose registers (GPRs) 204 connected to ALU0–ALU (N+M). As illustrated in FIG. 2, each of ALU0–ALU (N+M) can access GPRs 204. In fact, one GPR in the GPRs 204 is often used by more than one ALU in the same cycle, and each of ALU0–ALU(N+M) often accesses more than one GPR in the same cycle.

The VLIW hardware architecture of FIG. 2 includes two different types of ALUs. ALU0–ALU(N) execute normal arithmetic, logical and data movement operations. In ALU0–ALU(N), source data is supplied by either the parcel or from the GPRs 204, and target operand data flows from ALU0–ALU9 to the GPRs 204. These operations are referred to as "RR" operations or "register-register" operations. The parcels corresponding to ALU0–ALU(N) are also referred to as "RR" parcels.

ALU(N+1)–ALU(N+M) also perform the same operations as ALU0–ALU(N), but have additional functional capabilities. Specifically, ALU(N+1)–ALU(N+M) can also execute "RS" operations or "register-storage" operations. RS operations have some operands in the GPRs 204 and some operands in D-cache 104 which is connected to ALU(N+1)–ALU(N+M) and the GPRs 204. The value of this additional hardware is considered significant enough to implement for some ALUs, but not worth implementing for all ALUs. The parcels corresponding to ALU(N+1)–ALU(N+M) are called "RS" parcels. It is very important to assign the RS parcels to positions in the instruction register which control ALUs with the RS capability. The compiler must make sure that the number of RS operations in each VLIW instruction does not exceed the number of ALUs with that capability. Again, while the number of RR and RS ALUs in this embodiment is eight, any desired number of RR and RS ALUs could be used.

As illustrated in FIG. 2, ALU0–ALU(N+M) are also connected to condition registers 208. Each of ALU0–ALU(N+M) produces one condition code value on each cycle, and the results thereof are sent to condition registers 208. As discussed in Mr. Ebcioglu's paper, condition code values can represent greater than, less than, and equals for, for example, comparison operations. As a default, the condition code value output by an ALU will be stored in a specific condition register in condition registers 208 based on the position of the ALU. A parcel, however, can include a condition register select (CRS) field which will cause condition registers 208 to redirect the output of the corresponding ALU to a condition register in condition registers 208 specified by the CRS field.

As illustrated in FIG. 2, the D-cache 104 is also connected to the main storage 102. As discussed above, instructions and data reside together in main storage 102, but they are stored in two separate cache units. The separate units must each be large enough to accommodate the largest expected uses.

The VLIW architecture discussed above has been described in general terms. The number of ALUs, lengths of instruction registers, and size of GPRs, D-cache and main storage are all variables for the computer architect.

The connections between the instruction register 200 and the ALUs will now be described in greater detail. FIG. 3 illustrates in greater detail the connections between one ALU and a corresponding parcel 300, GPRs 204, and condition registers 208. Specifically, FIG. 3 illustrates in greater detail the connections to the source inputs 310 and 312 of one ALU. Since the connections between each ALU, the parcel corresponding thereto, the GPRs 204, and the condition registers 208 are the same, FIG. 3 only illustrates the connections of one ALU for the sake of clarity. Furthermore, it should be understood that the various data paths within CPU 101 have been represented in FIG. 3 in greatly simplified form for clarity. As would be recognized by one of skill in the art, in reality, many separate data paths into and out of the various components are required to support simultaneous data flow to and from multiple ALUs, registers, cache locations, etc. Additionally, many data and control lines have been omitted entirely from FIG. 3 for clarity.

Furthermore, it should be understood that while the VLIW architecture of FIGS. 1–3 is not the subject of the present application, these figures do not represent prior art.

FIG. 3 illustrates one example of a parcel in instruction register 200. In FIG. 3, four 3-to-8 decoders 302, 304, 316, and 318 are connected to the parcel 300. The 3-to-8 decoders 302 and 304 form part of a first selector logic 309, and the 3-to-8 decoders 316 and 318 form part of a second selector logic 324.

The two 3-to-8 decoders 302 and 304 supply decoded output to respective 8-way selectors 306 and 308 also forming part of the selector logic 309. The 8-way selector 306 is connected to the GPRs 204, and the 8-way selector 308 is connected to the GPRs 204 via the 8-way selector 306. The output of the 8-way selector 308 is connected to both source inputs 310 and 312 of the ALU. Similarly, the two 3-to-8 decoders 316 and 318 supply decoded output to respective 8-way selectors 320 and 322 also forming part of the second selector logic 324. The 8-way selector 320 is connected to GPRs 204, and the 8-way selector 322 is connected to GPRs 204 via the 8-way selector 320. The output of the 8-way selector 322 is connected to both source inputs 310 and 312 of the ALU. Additionally, the immediate field of the parcel 300 is connected to the two source inputs 310 and 312 of the ALU.

The condition code values output by the ALU are sent to a condition register selector 314. The condition register selector 314 selects one of the condition registers 208 in which to store the condition code values. As discussed above, this selection is performed according to a positional default unless the parcel includes a CRS field. Accordingly, the condition register selector 314 is also connected to the parcel 300 to receive the contents of a CRS field should one be present.

Next, the operation of the VLIW architecture illustrated in FIG. 3 will be described. Typically, the instruction register 200 is 500–1000 bits in length, and contains a predetermined number of parcels. Typically, each parcel is 32 bits long.

FIG. 3 illustrates one parcel 300. As illustrated, the first field of 6 bits of the parcel indicates the operation code OP, the next field RA of 6 bits indicates the source register, the following field RT of 5 bits indicates the destination register, the next bit is the safety bit SF, and the final 14 bits are the immediate field UI.

The operation code OP indicates the operation to be performed by the ALU (i.e., the instruction primitive). Typically, a VLIW architecture is based on a Reduced Instruction Set Computer (RISC) instruction set (i.e., instruction primitives from a RISC architecture). The source register field RA indicates the register from the GPRs 204 supplying one input to the ALU, the destination register field RT indicates the register in the GPRs 204 for storing the result produced by the ALU, the safety bit SF is used to mark a register during speculative code movement which is not material to this application and therefore will not be discussed further, and the immediate field stores data which forms the second input to the ALU.

The GPRs 204 preferably include 64 64-bit registers divided into eight groups each. The first selector logic 309 selects and outputs the contents of one of the GPRs 204 based on the register address field RA. Specifically, the upper 3 bits of the source register field RA are converted by the 3-to-8 decoder 302 to form an 8 bit selection address. The 8-way selector 306 uses the output of the 3-to-8 selector 302 to address one of the eight GPR groups in the GPRs 204. The lower 3 bits of the source address field RA designate a particular GPR within the group selected by the upper three bits. These lower 3 bits are decoded by the 3-to-8 decoder 304, and the 8-way selector 308 selects the specific GPR within the GPR group selected by the 8-way selector 306 based on the decoded output of the 3-to-8 decoder 304.

As shown in FIG. 3, the contents of the GPR selected by the 8-way selectors 306 and 308 may by supplied to either source input 310 or 312 of the ALU. As further shown, the immediate field of the parcel 300 may also be supplied to either source input 310 or 312 of the ALU.

For instance, assume that the operation to be performed is an ADDI operation wherein the contents of the GPR indicated by source register field RA are added to the data in the immediate field of the parcel 300. In this instance, the contents of the register addressed by the source register field RA are supplied to one of the source inputs 310 and 312 of the ALU, while the contents of the immediate field are supplied to the other of the source inputs 310 and 312 of the ALU. As one skilled in the art will readily appreciate, a controller (not shown) determines which of the ALU source inputs 310 and 312 receives the output of the 8-way selector 308 and the immediate field of the parcel 300.

The ALU then performs the addition operation, and outputs the result to either a GPR in the GPRs 204 designated by the destination register field RT, or a location within the D-cache 104 designated by destination register field RT.

The destination register field RT, however, includes only 5-bits. This is one bit less than the number required to address one of the 64 64-bit GPRs 204. To supply the sixth and most significant bit, the VLIW architecture of FIG. 3 employs parcel affinity. According to parcel affinity, the RR and RS parcels are alternately arranged in the instruction register 200 to form RR and RS parcel pairs. The first RR and RS parcel pair is an odd numbered pair, while the second parcel pair is an even numbered pair. The remaining parcel pairs are also designated odd or even based on whether the number of the parcel pair is even or odd. The most significant, sixth bit, is then set to one for odd parcel pairs and set to zero for even parcel pairs. The placement of parcels within even and odd parcel pairs is handled by the VLIW compiler.

Although not shown in FIG. 3, selector logic, similar to the first selector logic 309, supplies the ALU output to the GPR of GPRs 204 specified by the destination register field RT.

The condition code value produced by the ALU, such as carry overs during an addition operation, are supplied to the condition register selector 314. Based on the position of the ALU, the condition register selector 314 supplies the condition code value output by the ALU to an associated condition register within the condition registers 208 since the parcel 300 does not include a CRS field.

FIG. 3 further includes second selector logic 324. The second selector logic 324 performs the same operation as the first selector logic 309, but does so based on a second source register field RB (not shown). As discussed above, many parcel formats exist. For instance, parcel 300 could instruct that the contents of two GPRs in GPRs 204 are to be operated on. In this instance, the parcel 300 would include a second source register field RB. The first selector logic 309 would use the contents of the first source register field RA to send the contents of one of the GPRs 204 to one of the source inputs 310 and 312 of the ALU, and the second selector logic 324 would use the contents of the second source register field RB to send the contents of one of the GPRs 204 to the other of the source inputs 310 and 312 of the ALU. Of course, as recognized by one skilled in the art, the controller would have to control the outputs of the 8-way selectors 308 and 322 such that the register contents were sent to each of the ALU source inputs 310 and 312.

Besides arithmetic and logic operations, RISC primitives (i.e., operations directed by the parcels) include load/store operations. A load/store operation causes the processor to load data stored in one of the GPRs 204, D-cache 104, or main storage 102 and store this data in one of the GPRs 204, D-cache 102 or main storage 102. Such instructions are well-known in the art and will not be discussed in detail.

As discussed above with respect to FIG. 3, a parcel in a VLIW includes two and sometimes three register fields. Furthermore, while previous non-VLIW and some VLIW architectures included only 32 general purpose registers, the VLIW architecture of the embodiment of FIG. 3 preferably includes 64 64-bit GPRs. Thus, larger source and target register fields are required to address a particular GPR. Consequently, the number of GPRs and the number of register fields within a parcel have shrunk the remaining available space within a parcel.

For instance, in parcel 300 illustrated in FIG. 3, insufficient space exists for a CRS field which would instruct condition register selector 314 as to the condition register in the condition registers 208 in which to store the condition code values. Accordingly, the VLIW architecture of FIG. 3 must rely on a condition register selector 314 performing in a default mode wherein the condition register selector 314 stores the condition code values output by the ALU in one of the condition registers 208 which corresponds to the ALU based on the position of the ALU.

As one skilled in the art will readily appreciate, having to operate in this manner limits the level of optimization. For instance, for a condition code value to travel from the condition register storing the condition code value according to the default storage methodology to a component requiring the condition code value may take more than one clock cycle. By contrast, the propagation delay between that same component and a different condition register may only be one clock cycle or less. If the parcel 300 included a CRS field, the condition code value could have been directed to this closer condition register. When the processing of a parcel unexpectedly takes longer than one clock cycle, then the processing of the entire VLIW is delayed until processing of this parcel can be completed. Accordingly, such unexpected delays significantly and detrimentally affect optimization.

As a further consequence of the limited space available within a parcel, the immediate field of this embodiment is only 14 bits long. As one skilled in the art will appreciate, besides representing a mismatch with the instruction set architecture which is based on powers of 2, this places a limit on the value which the immediate field may represent. For instance, an immediate field of 14 bits cannot represent a number greater than 16,384. Unfortunately, many operations require operating on much larger numbers. Due to the limits placed on the immediate field, however, such functions may not be performed using a single immediate field. Instead, the immediate field must be broken into a series of RISC instructions by the compiler and performed over several VLIW. Accordingly, the operation takes several clock cycles to perform, and instructions dependent on the result must be delayed to subsequent VLIW by the compiler. Again, this places a severe limit upon the level of optimization.

Similarly, the memory offset required to perform a load/store operation may be larger than the size of the displacement field (D-field) in the load/store parcel. Accordingly, the load/store instruction must also be broken into a series of RISC instructions causing the operation to take several clock cycles.

One possible solution would, of course, be to expand the size of VLIW. It is, however, desirable to reduce or maintain the size of the instruction word, the attendant complexity and cost of the processor, and the instruction bandwidth, while at the same time maintaining sufficient flexibility of function to realize the advantages of the VLIW architecture. Additionally, the benefit of VLIW diminishes once a certain size is exceeded due, for example, to an increase in unexpected delays associated therewith.

SUMMARY OF THE INVENTION

As an object of the present invention to provide an enhanced processing method and apparatus for a computer system which overcomes the problems with respect to the above-discussed VLIW architectures.

Another object of the present invention is to increase the performance of a computer system.

Another object of this invention is to enhance the ability of a computer system processor to perform multiple simultaneous operations.

An additional object of the present invention is to more efficiently encode instructions used in a VLIW processor of a computer system.

Another object of the present invention is to increase the capability of a VLIW processor of a computer system while maintaining the length of the VLIW.

A still further object of the present invention is to provide a VLIW architecture and method for functionally expanding an instruction parcel.

These and other related objects are achieved by pairing parcels together to implement an operation which requires more space than an individual parcel. Preferably, the instruction is placed within one parcel called the instruction parcel, and the data required to complete the instruction is placed within another parcel called an extend immediate upper parcel or "EIU parcel." Preferably, the EIU parcel is adjacent to the instruction parcel. The EIU parcel may be adjacent to the left or right of the instruction parcel.

When the instruction parcel does not include sufficient space for the CRS field, then this field can be placed in the EIU parcel. Similarly, if the immediate field of the instruction parcel is insufficient to represent a large number, then the lower order bits forming that number will be placed in the immediate field of the instruction parcel, while the higher order bits can be placed within an immediate field of the EIU parcel. The VLIW architecture according to the present invention then allows the immediate fields of the instruction parcel and the EIU parcel to be concatenated performing an input to the ALU. A similar technique can be used for the D-field of a load/store instruction.

These are merely two examples of how an EIU parcel can be used to expand the functional capabilities of an instruction parcel. Any number of additional functional expansion techniques are available. Accordingly, the two techniques described herein are merely examples and not exhaustive of the functional expansion capabilities of the present invention.

The above and related objects are further achieved by providing a very long instruction word (VLIW) processor, comprising an instruction register storing a VLIW having a plurality of parcels, said plurality of parcels including an instruction parcel and an extension parcel, said extension parcel including extension data related to data in said instruction parcel; a plurality of data registers; processing means, corresponding to each parcel, for processing data in a corresponding parcel; and selecting means, corresponding to each processing means, at least said selecting means corresponding to said instruction parcel operationally connecting said processing means corresponding to said instruction parcel with said plurality of data registers and said extension parcel.

The objects are also achieved by providing a processing method for a very long instruction word (VLIW) architecture, comprising (a) storing a VLIW in an instruction register, said VLIW having a plurality of parcels, each of said plurality of parcels having processing logic corresponding thereto; (b) supplying data to processing logic from a corresponding parcel; and (c) supplying data from a non-corresponding parcel to said processing logic; (d) processing said data supplied from said steps (b) and (c) using said processing logic for said corresponding parcel.

Other objects, features and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE PREFERRED EMBODIMENTS

Figure 1:
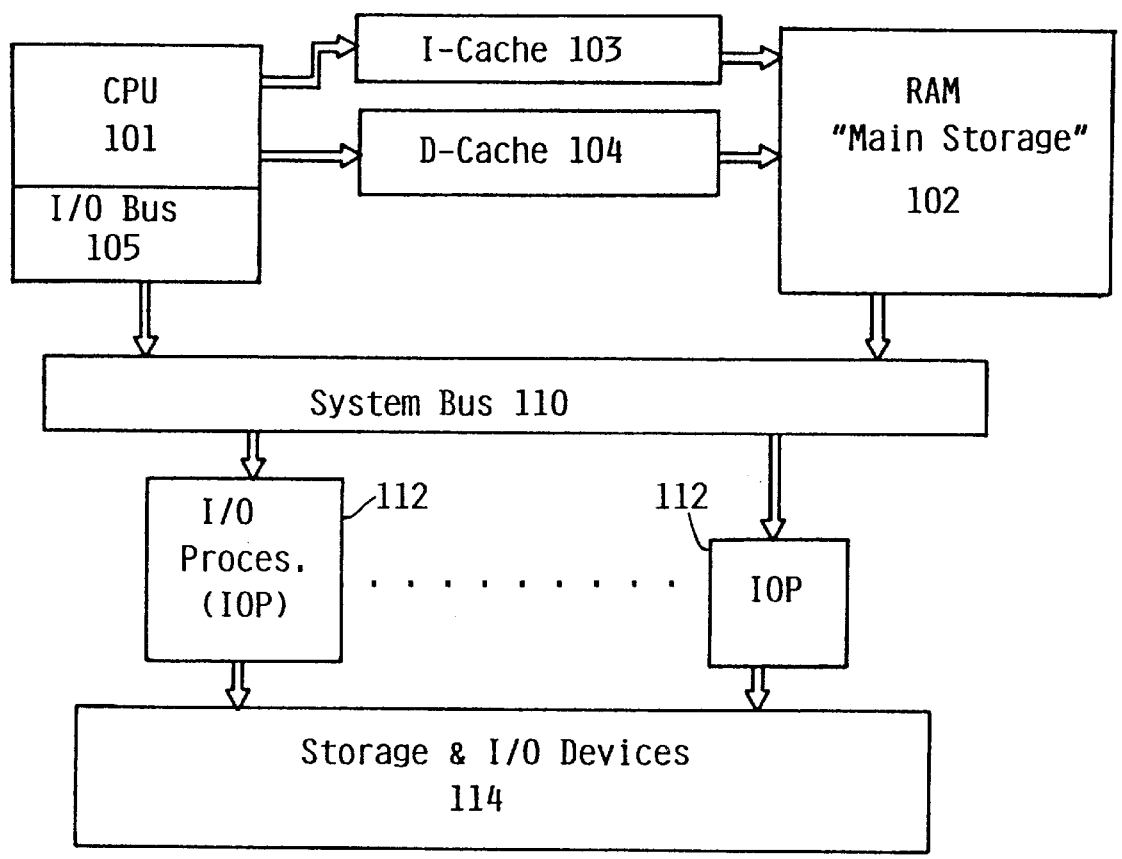
FIG. 1 is a high level diagram of the major hardware components of a computer system implementing a VLIW architecture.
Figure 2:
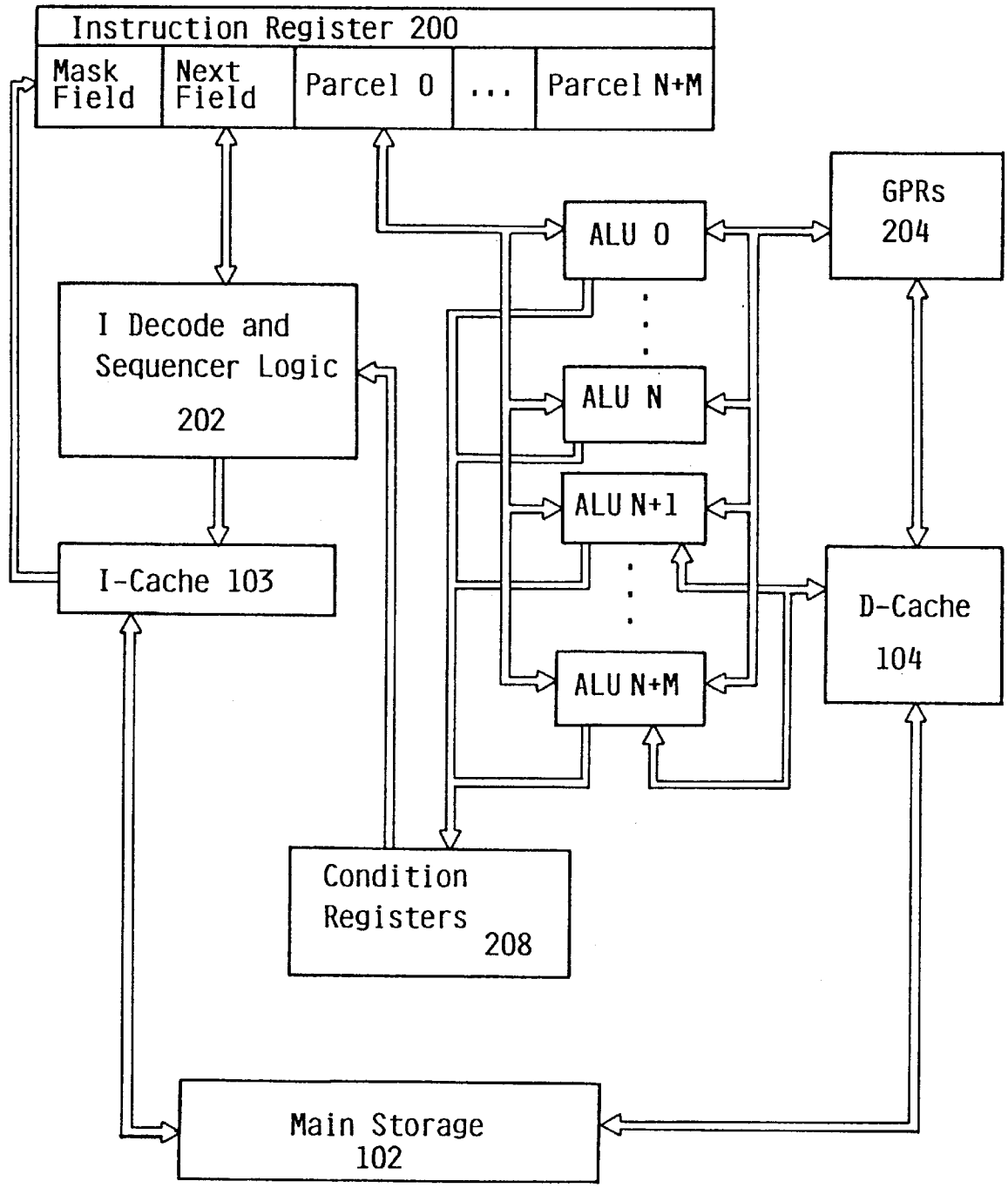
FIG. 2 is a high level diagram of the central processing unit of a computer system implementing a VLIW architecture.
Figure 4:
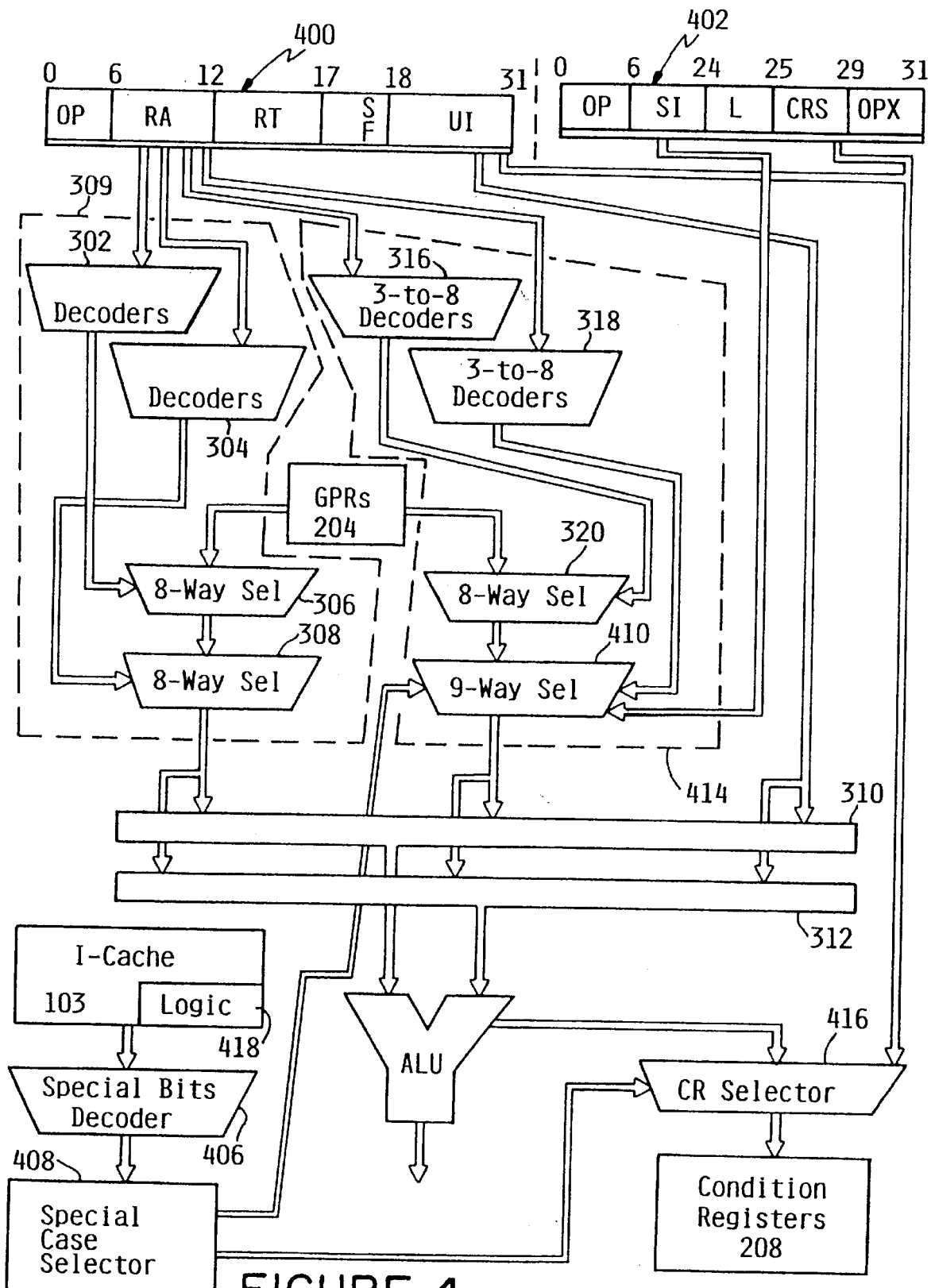
FIG. 4 is a diagram showing the ALU input connections in a VLIW architecture according to the present invention.

The major hardware components of the VLIW architecture according to the present invention are the same as shown in FIG. 2. The configuration of CPU 101, however, differs. These differences are illustrated in FIG. 4. Specifically, FIG. 4 illustrates the ALU input connection in a VLIW architecture according to the present invention which provides for functionally expanding an instruction parcel.

In FIG. 4, like reference numerals have been used to designate like components. FIG. 4 illustrates two parcels of a VLIW. A parcel 400 represents an instruction parcel, while a parcel 402 represents an EIU parcel. As discussed above in the Summary of the Invention section, the EIU parcel 402 need not be adjacent to the instruction parcel 400 on the right side, but can instead be adjacent to the instruction parcel 400 on the left as well. Accordingly, the connections to EIU parcel 402 illustrated in FIG. 4 are also present for the parcel adjacent to instruction parcel 400 on the left. These connections for the left adjacent parcel, however, have not been illustrated for the sake of clarity. Also, since the connections between each ALU, the parcel corresponding thereto, the parcels adjacent to the corresponding parcel, the GPRs 204, and the condition registers 208 are the same, FIG. 4 only illustrates the connections of one ALU for the sake of clarity. Additionally, it should be understood that the various data paths within CPU 101 have been represented in FIG. 4 in greatly simplified form for clarity. In reality, many separate data paths into and out of the various components are required to support simultaneous data flow to and from multiple ALUs, registers, cache locations, etc. Additionally, many data and control lines have been omitted entirely from FIG. 4 for clarity.

The instruction parcel 400 and the EIU parcel 402 are positioned adjacent to one another to minimize propagation delays. If the EIU parcel 402 were disposed in a parcel further from the instruction parcel 400, more time would be required for the EIU information to travel to the components (e.g., ALU, etc.) processing the instruction parcel 400. Such propagation delay can become so significant that it takes more than one clock cycle to process a VLIW including an instruction parcel and associated EIU parcel. By, preferably, placing the EIU parcel 402 adjacent to the associated instruction parcel 400, these propagation delays can be minimized.

Furthermore, the instruction register 200 and corresponding VLIW architecture of the preferred embodiment is organized to achieve parcel affinity such as described above. Additionally, in a preferred embodiment, the VLIW architecture of the present invention is based on a RISC instruction set.

Of course, the above merely sets forth the preferred embodiment, and modifications could be made thereto without departing from the spirit and scope of the present invention if the VLIW architect were willing to accept the resulting propagation delays and problems associated therewith.

In FIG. 4, four 3-to-8 decoders 302, 304, 316, and 318 are connected to the instruction parcel 400. The 3-to-8 decoders 302 and 304 form part of a first selector logic 309, and the 3-to-8 decoders 316 and 318 form part of a second selector logic 414. The first selector logic 309 serves to decode the source register field RA, while the second selector logic 414 serves to decode a second register field RB (not shown) when included in a parcel. Each of the first and second selector logic 309 and 414 has additional capabilities as discussed below.

The two 3-to-8 decoders 302 and 304 supply decoded output to the 8-way selector 306 and a 8-way selector 308 also forming part of the first selector logic 309. The 8-way selector 306 is connected to the GPRs 204, and the 8-way selector 308 is connected to the GPRs 204 via the 8-way selector 306. The output of the 8-way selector 308 is connected to both source inputs 310 and 312 of the ALU. Similarly, the two 3-to-8 decoders 316 and 318 supply decoded output to the 8-way selector 320 and a 9-way selector 410 also forming part of the second selector logic 414. The 8-way selector 320 is connected to GPRs 204, and the 9-way selector 410 is connected to GPRs 204 via the 8-way selector 320. The output of the 9-way selector 410 is connected to both source inputs 310 and 312 of the ALU.

The 9-way selector 410 receives data from the EIU parcel 402. Similar connections exist between the 9-way selector 410 and an EIU parcel which may be disposed to the left of the instruction parcel 400, but these connections have not been shown for the sake of clarity. The 9-way selector 410 also receives a selection input from a special case selector 408. As shown in FIG. 4, the special case selector 408 is connected to the I-cache 103 via a special bits decoder 406. The special case selector 408 outputs selection signals based on special bits set in the I-cache 103 by combinatorial logic 418 included therein.

The special case selector 408 also sends output to a condition register selector 416. The condition code values output by the ALU are sent to the condition register selector 416. The condition register selector 416 selects one of the condition registers 208 in which to store the condition code values. As discussed above, this selection is performed according to a positional default unless the parcel includes a CRS field. Accordingly, the condition register selector 416 is also connected to the instruction parcel 400 and the EIU parcel 402 to receive the contents of a CRS field should one be present.

The operation of the present invention illustrated in FIG. 4 will now be described. Those elements previously described with respect to FIG. 3, however, will not be described in detail to eliminate repetitiveness.

The instruction parcel 400 includes the same fields discussed with respect to parcel 300. Accordingly, a description of those fields will not be repeated. The EIU parcel 402 illustrated in FIG. 4 includes a first field of 6 bits specifying the operation code OP for the EIU parcel 402, the next 18 bits are the immediate field SI, the next field L indicates whether the EIU parcel 402 is a left or right EIU parcel, the next field of 4 bits is the CRS field, and the last field of 3 bits is an operation code extension. The operation code OP and, if present, the operation code extension indicate the operation to be performed using the EIU parcel 402. For instance, the operation code OP indicates that the EIU parcel 402 is an EIU parcel, and the format of the EIU parcel. Accordingly, the operation code OP can also identify whether a CRS field is present in the EIU parcel 402. It should be understood, however, that the EIU parcel 402 represents but one example of the many possible EIU parcel formats which one skilled in the art could readily construct in light of this disclosure.

During cache reload, the combinatorial logic 418 in the I-cache 103 detects special case VLIWs, and sets special case bits within the L1 and/or L0 cache of the I-cache 103 associated with a VLIW to identify the detected special cases. The special cases include EIU left, EIU right, 16 bit immediate field, D-field, and CRS field. This list of special cases is by no means exhaustive, and can be expanded or reduced based on the design preferences of the computer architect. The special case bits associated with the VLIW indicate whether one or more of these special cases exist.

The special case EIU left indicates that the instruction parcel has an EIU parcel associated therewith, and that this EIU parcel is adjacent to the left of the instruction parcel. Similarly, the EIU right special case indicates that the instruction parcel has an EIU parcel associated therewith, and that the EIU parcel is adjacent to the right of the instruction parcel.

The 16 bit immediate field special case indicates that as opposed to having only 14 bits in the immediate field, the instruction parcel has a 16 bit immediate field. The D-field special case indicates an extended displacement field on a memory reference instruction, and that this extended field is located in the EIU parcel. The CRS special case indicates that the EIU parcel includes a CRS field.

During cache reload, combinatorial logic 418 forming part of the control logic of the I-cache 103 decodes the operation codes OP for each parcel of each VLIW. From the decoded operation codes OP, the combinatorial logic can determine whether a parcel is an EIU parcel or includes a 16 bit immediate field, a D-field, or CRS field since this information, as discussed above, is specified in the operation codes OP. When a parcel is identified as an EIU parcel, the L field of the EIU parcel is used to determine whether the EIU parcel is an EIU left or EIU right. Based on the decoding operation, the combinatorial logic sets special bits in the I-cache 103 associated with each VLIW to indicate the special cases detected and for which parcels. Since the instruction set, and thus operation codes OP, used for a given architecture are freely specified by the computer architect, a specific example of the combinatorial logic 418 will not be discussed. Furthermore, the use of combinatorial logic 418 to decode instructions (i.e., operation codes) to test for operations specified therein is well-known and routine in the art of computer architecture. Accordingly, based on the instruction set chosen, the combinatorial logic 418 required to detect the special cases discussed above would be readily apparent to one skilled in the art.

During operation, the decoder 406 decodes the special case bits associated with each VLIW in the I-cache 103, and supplies the decoded output to a special case selector 408. When the decoded output from decoder 406 indicates that no EIU parcel is present, the special case selector 408 sends a disabling output to the 9-way selector 410. When, however, the decoded output of the decoder 406 indicates that an EIU parcel is associated with the instruction parcel 400, the special case selector 408 enables the 9-way selector 410.

Figure 3:
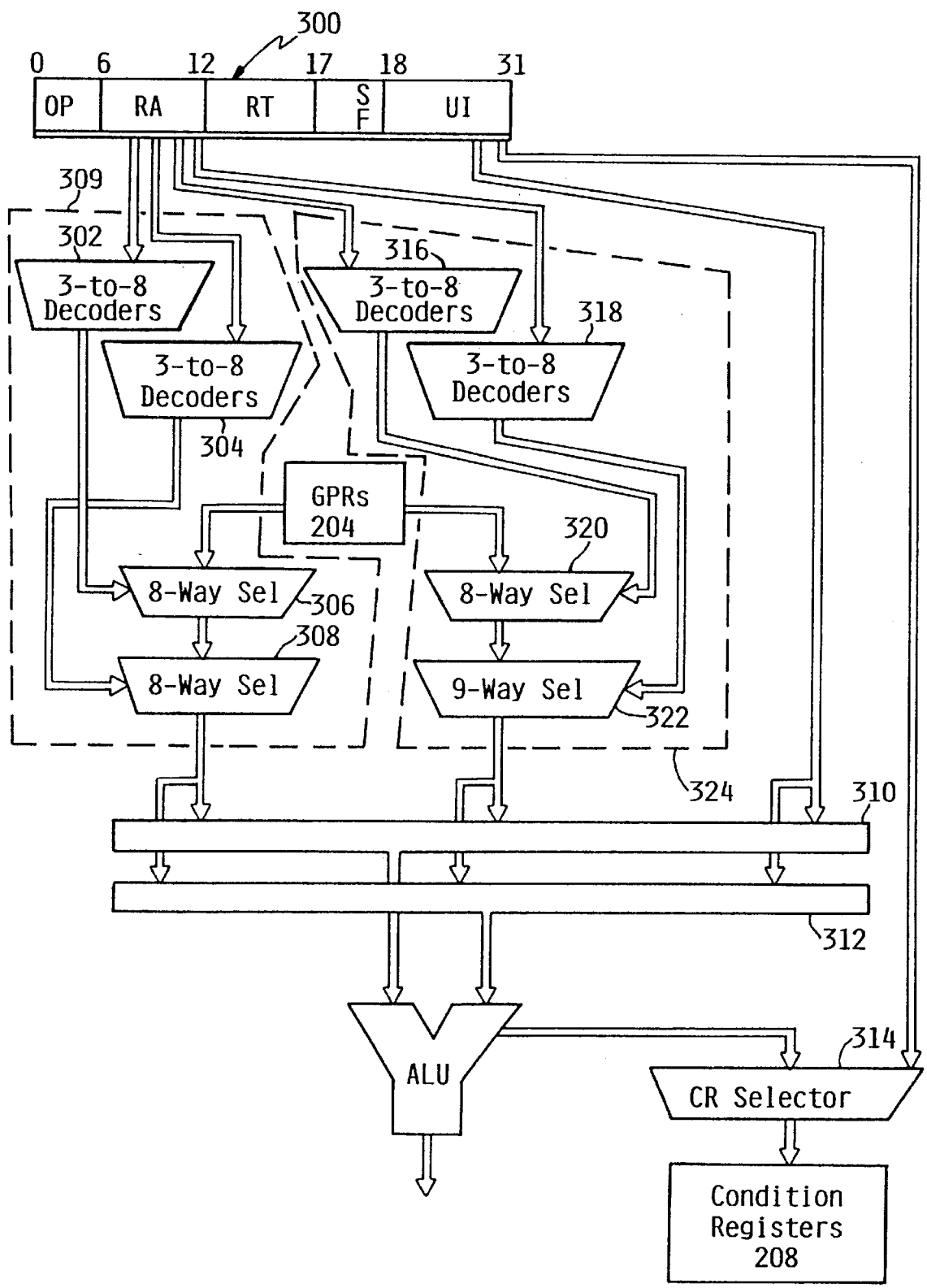
FIG. 3 is a diagram showing in greater detail the input connections to an ALU forming part of a VLIW architecture.

As discussed with respect to prior art FIG. 3, the upper 3 bits of a second source register field RB are decoded by a 3-to-8 decoder 316. This decoded output is used by an 8-way selector 320 to select one of the eight groups of 64-bit GPRs 204. When disabled, the 9-way selector 410 operates as an 8-way selector, and selects one of the 64-bit GPRs in the group of GPRs selected by the 8-way selector 320 based on the output of 3-to-8 decoder 318. In this manner, when the 9-way selector is disabled, the architecture of FIG. 4 operates in the same manner as that discussed above with respect to FIG. 3.

If, however, the special case selector 408 enables the 9-way selector 410, the 9-way selector 410 will select the immediate field SI of the EIU parcel 402 (or left adjacent EIU parcel if a left adjacent EIU parcel is provided instead of right adjacent EIU parcel 402). The 9-way selector 410 will then output the immediate field SI of the EIU parcel to the same ALU input 310 or 312 to which the immediate field UI of the instruction parcel 400 is sent. For instance, suppose that the immediate field UI of the instruction parcel is sent to ALU input 310, then the immediate field SI of the EIU parcel 402 will be sent to the same ALU input 310 such that the immediate field SI and the immediate field UI are concatenated. When concatenated, the immediate field SI of the EIU parcel 402 forms the most significant bits of the resulting 32 bit data word.

Meanwhile, the 3-to-8 selectors 302 and 304 decode the source register field RA, and the 8-way selectors 306 and 308 send the contents of the GPR in the GPRs 204 designated by the source register field RA to, for example, the other ALU input 312. The ALU then performs the operation specified by the op code OP in the instruction parcel 400. The ALU outputs the result of the operation to a GPR in the GPRs 204 designated by the destination register field RT, and sends the condition code value to the condition register selector 416. As with FIG. 3, the architecture of FIG. 4 includes selector logic (not shown) similar to selector logic 309 which supplies the output of the ALU to the GPR designated by the destination register field RT.

If the decoded output of the decoder 406 indicates that the EIU parcel 402 includes a CRS field, then the special case selector 408 enables the condition register selector 416 to store the condition code value output by the ALU in the condition register of condition registers 208 specified by the CRS field in EIU parcel 402.

By utilizing the EIU parcel 402, a greater level of optimization can be achieved since larger numbers may be represented in the VLIW than previously permissible. Accordingly, operations using large numbers can be performed in a single clock cycle. Additionally, use of the EIU parcel 402 provides for greater optimization through the provision of condition register selection.

It will be understood by those skilled in the art that instruction parcel 400 is but one example of many possible parcel formats, and that instruction parcel 400 and EIU parcel 402 represent only two examples of many possible functional expansions using an EIU parcel.

Furthermore, as one skilled in the art will readily appreciate, a controller (not shown) determines which of the ALU source inputs 310 and 312 receives the output of the 9-way selector 410 and the immediate field of the instruction parcel 400.

Besides the functional expansion capabilities discussed above, the architecture of FIG. 4 can perform the same operations as the architecture of FIG. 3. Accordingly, the present invention achieves the above-described functional expansion without increasing the size of the VLIW, and without significantly increasing the complexity of the resulting architecture.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

We claim:

1. A very long instruction word (VLIW) processor, comprising:
   an instruction register storing a VLIW having a plurality of parcels, said plurality of parcels including an instruction parcel and an extension parcel, said extension parcel including extension data related to data in said instruction parcel;
   a plurality of data registers;
   processing means, corresponding to each parcel, for processing data in a corresponding parcel; and
   selecting means, corresponding to each processing means, at least said selecting means corresponding to said instruction parcel operationally connecting said processing means corresponding to said instruction parcel with said plurality of data registers and said extension parcel.

2. The VLIW processor of claim 1, wherein said selecting means corresponding to said instruction parcel supplies said extension data from said extension parcel to said processing means corresponding to said instruction parcel.

3. The VLIW processor of claim 1, wherein said processing means corresponding to said instruction parcel includes an arithmetic/logic unit (ALU);

said ALU receives data contained in said instruction parcel at a first input; and said selecting means corresponding to said instruction parcel supplies said extension data contained in said extension parcel to said first input of said corresponding ALU.

4. The VLIW processor of claim 3, wherein said selecting means corresponding to said instruction parcel supplies said extension data contained in said extension parcel to said first input of said ALU such that said data contained in said instruction parcel is concatenated to said extension data contained in said extension parcel to form a data input to said ALU.

5. The VLIW processor of claim 4, wherein said extension data contained in said extension parcel forms most significant bits of said data input.

6. The VLIW processor of claim 4, wherein said selecting means corresponding to said instruction parcel comprises:

first selector logic having inputs operationally connected to said plurality of data registers and said extension parcel, said first selector logic selectively outputting said extension data from said extension parcel to said first input of said ALU when said first selector logic receives a selection signal indicating what said VLIW includes said extension parcel associated with said instruction parcel.

7. The VLIW processor of claim 6, wherein said selecting means corresponding to said instruction parcel further comprises:

second selector logic having inputs operationally connected to at least said plurality of data registers, said second selector logic for selectively outputting data from one of said plurality of data registers to a second input of said ALU based on data contained in said instruction parcel.

8. The VLIW processor of claim 1, wherein said selecting means corresponding to said instruction parcel comprises:

selector logic having inputs operationally connected to said plurality of data registers and said extension parcel, said selector logic selectively outputting data from said extension parcel to said first input of said ALU when said selector logic receives a selection signal indicating that said VLIW includes said extension parcel associated with said instruction parcel.

9. The VLIW processor of claim 8, further comprising:

instruction cache for storing and supplying VLIWs to said instruction register, and having decode logic, said decode logic decoding parcels in each VLIW during reload of said instruction cache to determine which parcels include extension data relating to data in other parcels; and selection signal generating means for generating said selection signal based on output from said decode logic.

10. The VLIW processor of claim 3, further comprising:

a plurality of condition registers for storing condition code values produced by each of said processing means; and said processing means corresponding to said instruction parcel includes a condition register selector, said condition register selector selectively storing a condition code value output by said processing means corresponding to said instruction parcel in one of said condition registers based on said extension data in said extension parcel when said condition register selector receives a selection signal indicating that said VLIW includes said extension parcel having condition register select data included in said extension data.

11. The VLIW processor of claim 1, further comprising:

a plurality of condition registers for storing condition code values produced by each of said processing means; and wherein said processing means corresponding to said instruction parcel includes a condition register selector, said condition register selector selectively storing a condition code value output by said processing means corresponding to said instruction parcel in one of said condition registers based on said extension data in said extension parcel when said condition register selector receives a selection signal indicating that said VLIW includes said extension parcel having condition register select data included in said extension data.

12. The VLIW processor of claim 1, wherein said selecting means corresponding to said instruction parcel supplies said processing means corresponding to said instruction parcel with said extension data from said extension parcel when said selecting means receives a selection signal indicating that said VLIW includes said extension parcel associated with said instruction parcel.

13. The VLIW processor of claim 12, further comprising:

instruction cache for storing and supplying VLIWs to said instruction register, and having decode logic, said decode logic decoding parcels in each VLIW during reload of said instruction cache to determine which parcels include extension data relating to data in other parcels; and selection signal generating means for generating said selection signal based on output from said decode logic.

14. The VLIW processor of claim 1, wherein said data in said instruction parcel processed by said processing means corresponding thereto includes an instruction field which indicates an operation to be performed by said processing means corresponding to said instruction parcel.

15. The VLIW processor of claim 1, wherein said processing means corresponding to said instruction parcel includes an arithmetic/logic unit (ALU); and further including, instruction decode means for decoding data in said instruction parcel to determine an operation to be performed by said ALU.

16. The VLIW processor of claim 1, wherein said extension parcel is adjacent to said instruction parcel in said VLIW.

17. A very long instruction word processor (VLIW), comprising:

an instruction register storing a VLIW having a plurality of parcels, said plurality of parcels including an instruction parcel and an extend immediate upper (EIU) parcel;

a plurality of data registers;

processing logic, corresponding to each of said plurality of parcels, processing data in a corresponding one of said plurality of parcels; and selector logic, corresponding to each processing logic, for operationally connecting said processing logic corresponding to said instruction parcel with said EIU parcel and said plurality of data registers.

18. A processing method for a very long instruction word (VLIW) architecture, comprising:

(a) storing a VLIW in an instruction register, said VLIW having a plurality of parcels, each of said plurality of parcels having processing logic corresponding thereto;

(b) supplying data to processing logic from a corresponding parcel; and (c) supplying data from a non-corresponding parcel to said processing logic;

(d) processing said data supplied from said steps (b) and (c) using said processing logic for said corresponding parcel.

19. The method of claim 18, wherein
said step (d) performs an arithmetic/logic operation and produces an arithmetic/logic result and a condition code value;
said step (c) supplies condition register select data from said non-corresponding parcel; and further comprising,
(d) selectively storing, using said processing logic for said corresponding parcel, said condition code value in one of a plurality of condition registers based on said condition register select data.

20. The method of claim 19, wherein
said step (b) supplies said processing logic for said corresponding parcel with arithmetic/logic data from said corresponding parcel;
said step (c) further supplies said processing logic for said corresponding parcel with arithmetic/logic data from said non-corresponding parcel; and
said step (d) concatenates said arithmetic/logic data from said corresponding parcel to said arithmetic/logic data from said non-corresponding parcel to form a single data input for said arithmetic/logic operation.

21. The method of claim 18, wherein
said step (b) supplies said processing logic for said corresponding parcel with arithmetic/logic data from said corresponding parcel;
said step (c) supplies said processing logic for said corresponding parcel with arithmetic/logic data from said non-corresponding parcel; and
said step (d) performs an arithmetic/logic operation and produces an arithmetic/logic result, and concatenates said arithmetic/logic data from said corresponding parcel to said arithmetic/logic data from said non-corresponding parcel to form a single data input for said arithmetic/logic operation.

22. A very long instruction word (VLIW) processor, comprising:
an instruction register storing a VLIW having a plurality of parcels, one of said plurality of parcels being an instruction parcel and another of said plurality of parcels being an extension parcel, said instruction parcel including an instruction field, and a data field, said extension parcel including a data field related to said data field of said instruction parcel; and
a plurality of processing means, each corresponding to one of said plurality of parcels, said processing means corresponding to said instruction parcel performing an operation specified by said instruction field using said data field of said instruction parcel and said data field of said extension parcel.

23. The VLIW processor of claim 22, wherein
said processing means corresponding to said instruction parcel concatenates said data field of said instruction processor to said data field of said extension parcel to form a single data input.

24. The VLIW processor of claim 22, further comprising:
selector logic, corresponding to said instruction parcel, supplying said data field of said extension parcel to said processing means corresponding to said instruction parcel.

25. The VLIW processor of claim 22, wherein said selector logic corresponding to said instruction parcel supplies said data field of said extension parcel to said processing means corresponding to said instruction parcel when said selector logic receives a selection signal indicating that said instruction register stores said VLIW having said extension parcel associated with said instruction parcel.

26. The VLIW processor of claim 24, further comprising:
instruction cache for storing and supplying VLIWs to said instruction register, and having decode logic, said decode logic decoding parcels in each VLIW during reload of said instruction cache to determine which parcels are extension parcels; and
selection signal generating means for generating said selection signal based on output from said decode logic.

27. The VLIW processor of claim 22, wherein
said extension parcel further includes functional data; and
said processing means corresponding to said instruction parcel performs at least one additional operation based on said functional data.

28. The VLIW processor of claim 27, further comprising:
a plurality of condition registers for storing condition code values produced by said processing means; and wherein
said processing means corresponding to said instruction parcel further includes a condition register selector, said condition register selector selectively stores a condition code value output by said processing means corresponding to said instruction parcel in one of said condition registers based on said functional data in said extension parcel.

29. The VLIW processor of claim 22, wherein said instruction parcel and said extension parcel are adjacent parcels.

30. A very long instruction word (VLIW) processor, comprising:
an instruction register having a plurality of parcels, one of said plurality of parcels being an instruction parcel and another of said plurality of parcels being an extension parcel, said instruction parcel including an instruction field, and said extension parcel including functional data;
a plurality of processing means, each corresponding to one of said plurality of parcels, said processing means corresponding to said instruction parcel performing a first operation specified by said instruction field and performing at least one additional operation related to said first operation based on said functional data.

31. The VLIW processor of claim 30, further comprising:
a plurality of condition registers for storing condition code values produced by said processing means; and wherein
said processing means corresponding to said instruction parcel further includes a condition register selector, said condition register selector selectively stores a condition code value output by said processing means corresponding to said instruction parcel in one of said condition registers based on said functional data in said extension parcel.

* * * * *

UNITED STATES PATENT AND TRADEMARK OFFICE
CERTIFICATE OF CORRECTION

PATENT NO.   :   5,890,009
DATED        :   Mar. 30, 1999
INVENTOR(S)  :   David A. Luick and Philip B. Winterfield It is certified that error appears in the above-identified patent and that said Letters Patent is hereby corrected as shown below:

Claim 17, Col. 16, Line 57, "processing data" should read --for processing data--.

Signed and Sealed this

Twenty-seventh Day of July, 1999

Attest:

Q. TODD DICKINSON

*Attesting Officer*    *Acting Commissioner of Patents and Trademarks*